United States Patent [19]
Norris et al.

[11] Patent Number: 5,805,587
[45] Date of Patent: Sep. 8, 1998

[54] CALL NOTIFICATION FEATURE FOR A TELEPHONE LINE CONNECTED TO THE INTERNET

[75] Inventors: John H. Norris, Highlands; Thomas Leonard Russell, Jr., Colts Neck, both of N.J.

[73] Assignee: AT&T Corp., Middletown, N.J.

[21] Appl. No.: 562,678

[22] Filed: Nov. 27, 1995

[51] Int. Cl.[6] .............................. H04L 12/28; H04M 3/42; H04M 11/00; H04M 1/64

[52] U.S. Cl. ........................... 370/352; 370/389; 370/392; 379/67; 379/88; 379/89; 379/90.01; 379/93.01; 379/93.09; 379/93.35; 379/210; 379/212; 379/215; 379/230

[58] Field of Search ...................................... 370/389, 392, 370/352, 485; 379/100, 201, 90, 93, 94, 243, 229, 230, 215, 67, 88, 89, 93.05, 93.35, 210, 212, 214, 90.01, 93.01, 93.07, 93.09

[56] References Cited

U.S. PATENT DOCUMENTS

| | | | |
|---|---|---|---|
| 4,771,425 | 9/1988 | Baran et al. | 370/458 |
| 4,969,184 | 11/1990 | Gordon et al. | 379/100.13 |
| 4,995,074 | 2/1991 | Goldman et al. | 379/93.35 |
| 5,434,906 | 7/1995 | Robinson et al. | 379/67 |
| 5,533,110 | 7/1996 | Pinard et al. | 379/201 |
| 5,577,105 | 11/1996 | Baum et al. | 379/93.05 |
| 5,608,786 | 3/1997 | Gordon | 370/352 |
| 5,625,676 | 4/1997 | Greco et al. | 379/67 |

FOREIGN PATENT DOCUMENTS

WO 96/20553 7/1996 Canada ........................... H04M 3/50

OTHER PUBLICATIONS

Yang, C., "RFC 1789: INETPhone–Telephone Services and Servers on Internet." Apr. 1995. <http://ds.internic.net/rfc/rfc1789.txt>(12 Feb. 1997).

Casner, S., et al. "RFC 14ZZ: Ingegrated Service in the Internet Architecture." Sep. 1993.

Clark, D., et al. "Supporting Real–Time Applications in an Integrated Services Packet Network–Architecture and Mechanism." ACM COMM'92–Aug. 1992.

Baran, P., "On Distributed Communications Networks." IEEE Transactions on Communications Systems, manuscript received Oct. 1963, Mar. 1964.

McNinch, B. "Screen–Based Telephony," IEEE Communications Magazine, pp. 34–38, Apr. 1990.

IBM Technical Disclosure Bulletin, vol. 37, No. 9, Sep. 1994, pp. 101–104, XP000473347, "Workstation Communications System."

*Primary Examiner*—Wellington Chin
*Assistant Examiner*—Melissa Kay Carman
*Attorney, Agent, or Firm*—Thomas A. Restaino; Michele L. Conover

[57] ABSTRACT

A facility is provided to alert a subscriber whose telephone station set is connected to the Internet of a waiting call via the Internet connection. Specifically, a call that is waiting may be forwarded via the Public Switched Network to a services platform, which, in turn, establishes a connection to the subscriber using the Internet. The platform then notifies the subscriber of the waiting call via the Internet connection. The platform may then forward the telephone call to the subscriber via the Internet responsive to a subscriber request to do so with interrupting the subscriber's Internet connection.

24 Claims, 7 Drawing Sheets

| SUBSCRIBER IDENTITY | ADDRESS | TELEPHONE NUMBER |
|---|---|---|
| PASSWORD | ... | |
| SOFTWARE CONFIGURATION | PACKET VOICE CONFIGURATION | ... |
| CALL FORWARDING OPTIONS | | TELEPHONE OFFICE NUMBER |
| RACF NUMBER | RACF PASSWORD | IP ADDRESS | TELEPHONE CHANNEL |
| ACTIVE TERMINAL PROCESS | | |

CALL NOTIFICATION FEATURE FOR A TELEPHONE LINE CONNECTED TO THE INTERNET

FIELD OF THE INVENTION

The invention relates to a call waiting feature for telephone calls and more particularly relates to a call waiting feature for a called telephone station set that is busy as a result of being connected to a conventional data network, e.g., the Internet.

BACKGROUND OF THE INVENTION

Call waiting is a telephone feature that is provided by a telephone switching office, e.g., a Central Office (CO), to alert a called party to an incoming call when the party's telephone station set is busy with another call. Such alerting is typically implemented by transmitting a subtle tone or "click" to the called party. The tone or click may also be heard by the party communicating with the called party. At that point, the called party may place the existing call on hold and answer the new incoming call. We have recognized that a telephone network/switching office cannot apply the call waiting feature to a telephone line that is connected to the well-known Internet (a.k.a. the world wide web). This limitation stems from the fact that the application of call waiting and/or voice signals to the telephone line would interfere with the data connection. Also, when a data call is established between a subscriber's telephone line and the Internet via an Internet Access Service (IAS), the subscriber would not be able to hear the call waiting tone even if the data connection/communications were able to recover from the interference. Disadvantageously, then, a telephone subscriber who subscribes to call waiting cannot be notified that a call is waiting when the subscriber's line is connected to the Internet.

SUMMARY OF THE INVENTION

We have recognized that an alternate for the call waiting feature may be used to notify a subscriber of a waiting call even though the subscriber's telephone line is connected to the Internet. Specifically, a call directed to the subscriber may be forwarded via the public switched network to a services platform, which, in turn, establishes a connection to the subscriber using the Internet, and then notifies the subscriber of the call waiting via the Internet. The platform may then forward the telephone call to the subscriber via the Internet responsive to a subscriber request to do so.

DETAILED DESCRIPTION

An illustrative embodiment of the invention will be discussed in the context of a public switched network including a local exchange carrier (central office). It is understood of course that such a discussion is not to be taken as a limitation, since the claimed invention may be practiced in conjunction with different types of telecommunications systems, for example, a private telecommunications network.

Figure 1:
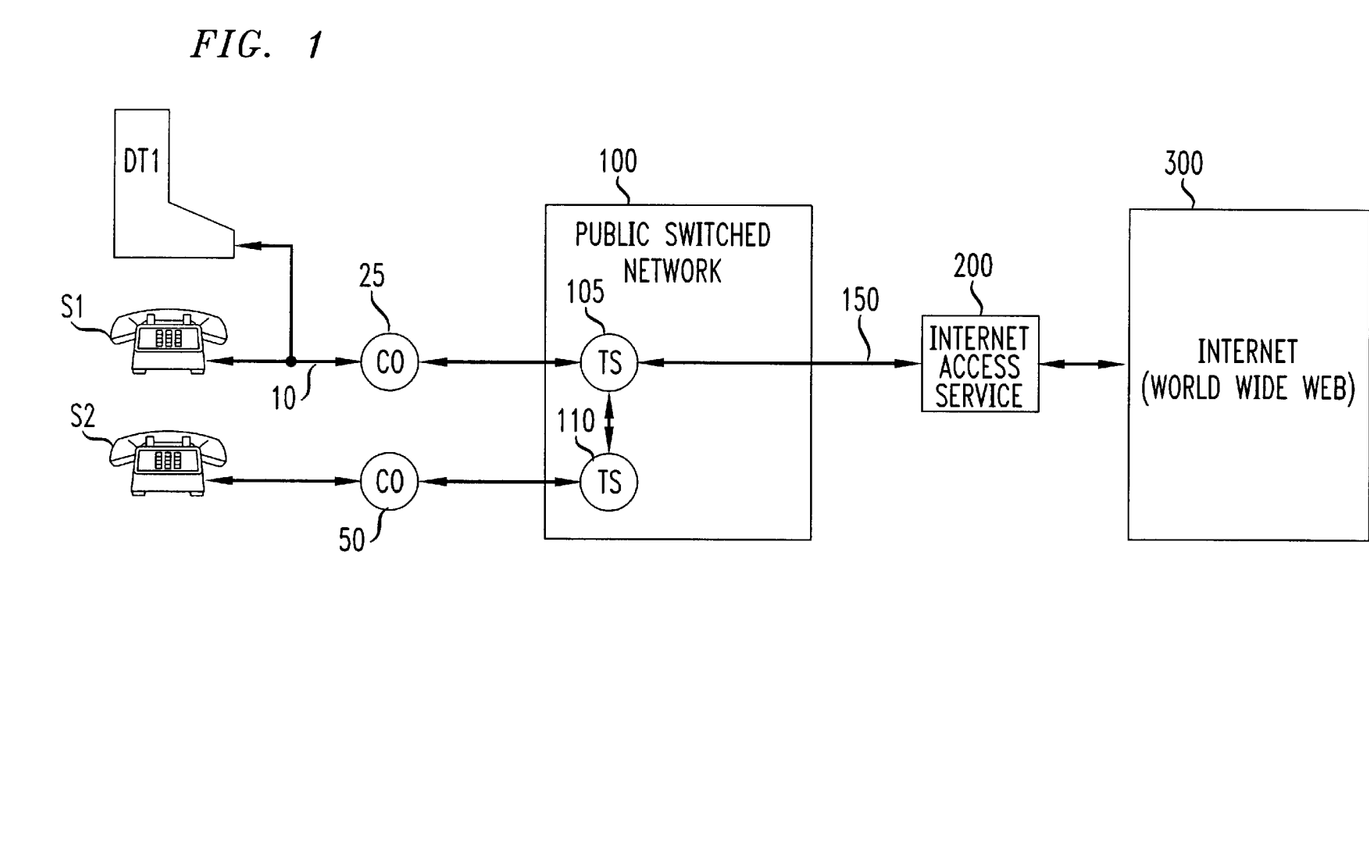
FIG. 1 illustrates a telecommunications system in which the principles of the invention may be practiced.

Accordingly, then, a telephone subscriber, e.g., the subscriber associated with telephone station S1, FIG. 1, may access the well-known Internet by first loading appropriate Internet communications software, e.g., the Chameleon software product, version 4.5 available from NetManage, Inc. of Cupertino, Calif. (hereinafter "Chameleon" software), into associated data terminal DT1, which may be, for example, a personal computer having multimedia and telephony capability, as will be discussed below. The subscriber, in a conventional manner, may then cause terminal DT1 to place a telephone call to an Internet access service that the subscriber is associated with, such as Internet Access Service (IAS) 200 to access the Internet, represented by block 300. In doing so, terminal DT1 places telephone line 10 in an off-hook state and then dials the telephone number assigned to IAS 200. Assuming that IAS 200 is not located in the same local dialing region as terminal DT1, then the telephone call will be routed via public switched network (PSN) 100, e.g., the AT&T network. Specifically, upon receipt of the dialed number, then CO 25, in a conventional manner, establishes a telephone connection to toll switch (TS) 105 and passes the called number and the ANI associated with line 10 to TS 105. TS 105, in turn and in a conventional manner, establishes a connection to IAS 200 via communication path 150. In an illustrative embodiment of the invention, communication path 150 may be one or more conventional T1 carrier lines each having 24 communications channels in which at least one of the channels serve as a signaling channel. TS 105 thus routes the call to IAS 200 by sending a so-called call set-up message over the signaling channel, in which the message identifies, inter alia, the TI channel carrying the incoming call, called number, and calling ANI. IAS 200 answers the call by sending an "acknowledgment" message over the signaling channel to TS 105. IAS 200 then sends conventional data communications signals to the terminal DT1 software (e.g., the aforementioned Chameleon software) that is adapted to allow the subscriber to communicate/interface with Internet 300.

Figure 2:
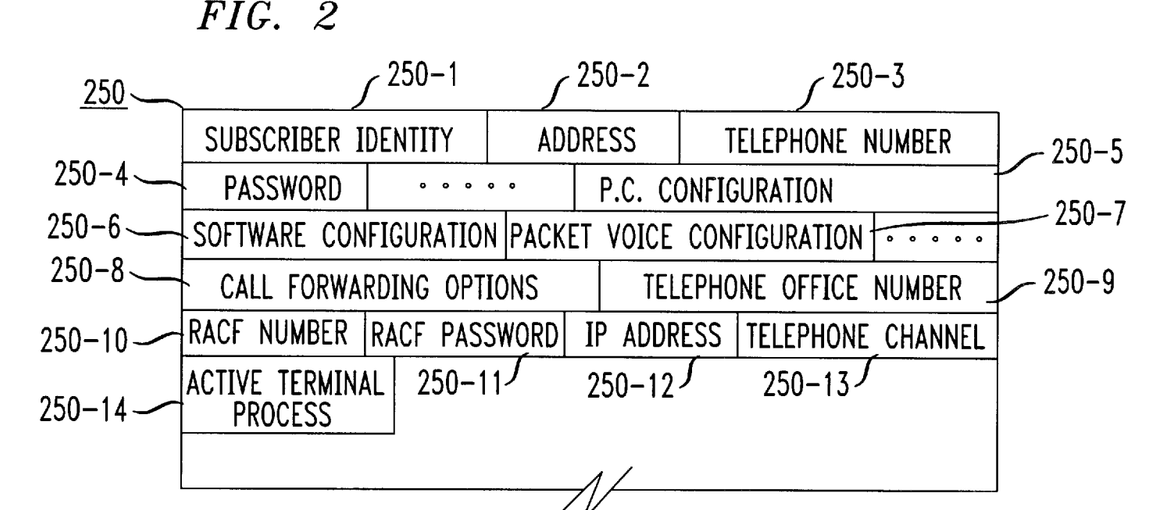
FIG. 2 is an illustrative example of a data record that may be used to implement the inventive service in the system of FIG. 1.

Responsive to receipt of the subscriber's incoming call, IAS 200 removes the ANI from the signaling channel and then translates the ANI into a memory address that it uses to access its internal memory to unload a data record that is associated with the subscriber. An illustrative example of such a record is shown in FIG. 2. Specifically, record 250 is formed from a number of fields respectively containing the subscriber's identity (name)250-1, address 250-2, telephone number (ANI)250-3, password 250-4, and other data. IAS 200 permits the caller to access Internet 300 if a password that the caller/subscriber enters via DT1 matches the contents of field 250-4. If such a match does not occur after the caller has made a number of attempts to enter the correct password via terminal DT1, then IAS 200 terminates the call, as is done conventionally whenever a login fails. Assuming a match occurs, then IAS 200 communicates with the caller in accord with the contents of fields 250-5 and 250-6 (FIG. 2) which respectively specify the configuration of terminal DT1 and configuration of the Internet interface software, e.g., the aforementioned Chameleon software, loaded in terminal DT1. In addition, terminal T1 assigns an Internet IP address to the call and stores the address in field 250-12. (Alternatively, terminal DT1 may assign such an address to the subscriber just once, when the subscriber initially enters a subscription for the service as is done conventionally.) IAS 200 thereafter uses the address to route the subscriber's data messages (packets) to and from Internet 300 via a conventional data router, as will be discussed below. IAS 200 also stores the address of the communications path 150 (i.e., B channel) used to receive the call in field 250-13. The subscriber may then begin to access Internet 300 in a conventional manner. That is, terminal DT1 formulates and transmits data packets addressed to Internet destinations indicative of entries/inquiries specified by the subscriber as a result of interacting with Internet 300 using the software loaded in terminal DT1. Similarly, IAS 200 routes via path 150 and TS 105 packets that it receives from the Internet and addressed to terminal DT1.

Figure 3:
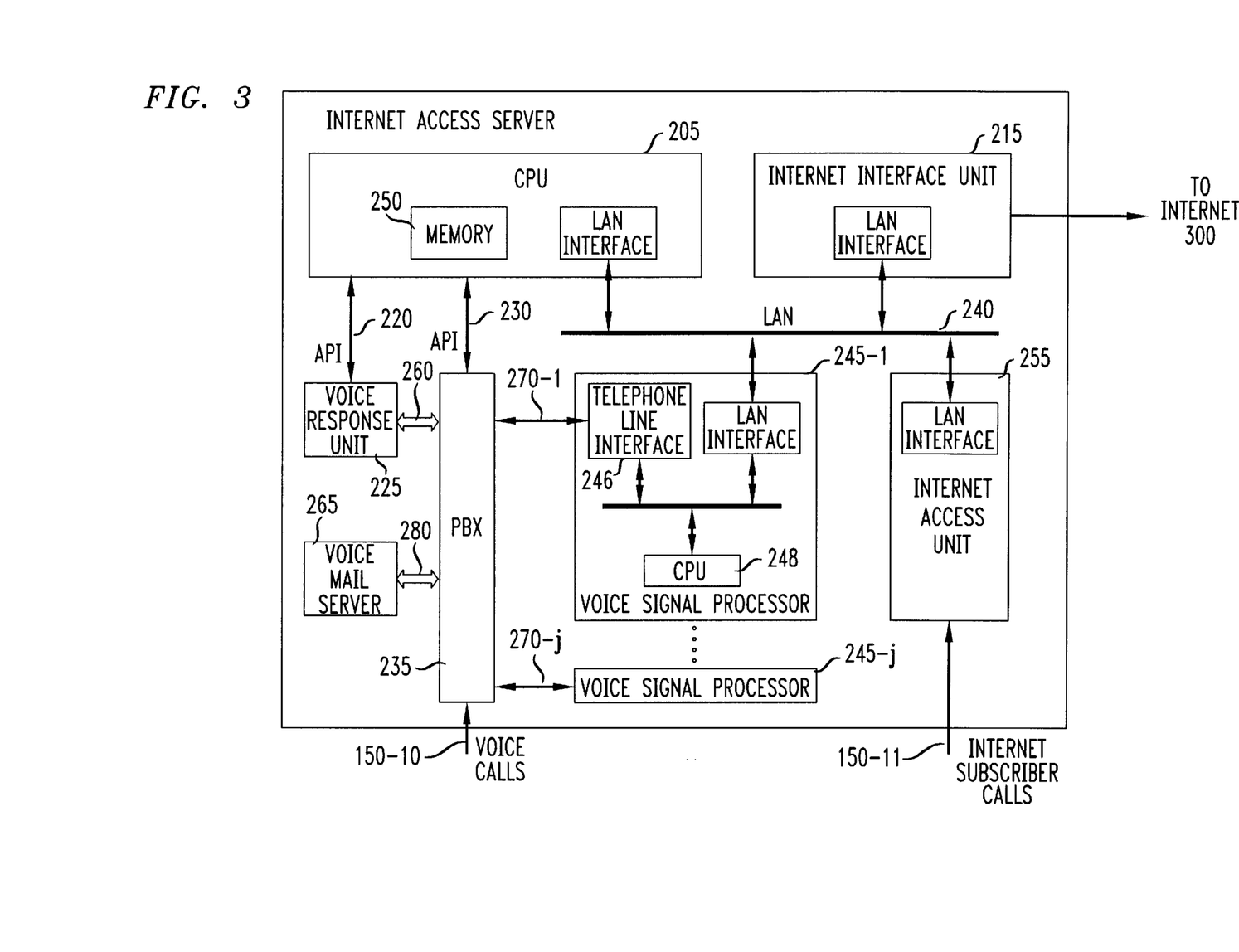
FIG. 3 is a broad block diagram of the Internet Access Service (IAS) of FIG. 1.

More specifically and also referring now to FIG. 3, it is seen that an IAS 200 includes Central Processor Unit (CPU) 205, which may be, for example, the SPARC 10 workstation commercially available from Sun Microsystems, Inc. CPU 205, which operates under the control of the well-known UNIX operating system, communicates with the various elements forming the associated IAS 200 via so-called Attached Processor Interfaces (API) 220 and 230, and via local area network (LAN) 240. Such elements include PBX 235 and Internet Access Unit (IAU) 255, in which PBX 235, may be, for example, the Definity telecommunications system available from AT&T and in which IAU 255 may be, for example, the Ascend MAX 4000 apparatus available from Ascend Communications, Inc. of Mountain View, Calif. PBX 235 and IAU 255, more particularly, are designed to present an interface to a communication path comprising 23 B channels and one D channel, e.g., T1 carrier 150-10 and 150-11. Each such B channel may be used to establish a call connection between a telephone switch, e.g., TS 105, and the associated IAS 200. The D channel, on the other hand, may be used to transport signaling information relating to a B channel call connection.

(As will be discussed below, TS 105 routes calls directed to Internet 300 via IAS 200 over path 150-11 and routes calls that are forwarded to IAS 200 over path 150-10.)

An IAS 200 includes conventional Voice Response Unit (VRU) 225 which may be, for example, the CONVERSANT interactive voice information system available from AT&T. It also includes a conventional voice mail server (VMS) 265, for example, the AT&T AUDIX telecommunications voice processor, for voice mail and messaging. As will be discussed below, VRU 225 and VMS 265 are connected to PBX 235 via respective communications paths 260 and 280. IAS 200 further includes an Internet Interface Unit (IIU) 215 for providing a physical as well as a logical interconnection between LAN 240 and Internet 300. IIU 215 includes a convention data router, for example, the model 7000 router available from Cisco Systems Inc., and a high-speed data service unit, for example, the DataSMART T3/E3 IDSU available from Kentrox of Portland, Oreg.

When the subscriber's call (placed via terminal DT1) is received via a B channel of path 150-11, IAU 255 responds to the incoming call by presenting the caller with a conventional login procedure. If the caller responds by entering the correct password (i.e., the password contained in field 250-4 of the associated record (FIG. 2), which IAU 255 also obtains as a result of communicating with processor 205 via LAN 240), then IAU 255 assigns a conventional IP address to the call as a way of interfacing the call (assigned B channel) with Internet 300 via IIU 215. (It is noted that for a conventional Internet access service arrangement, the subscriber is assigned a permanent IP address which would be stored in field 250-12 (FIG. 2) at the time that the subscriber obtains the service.) In addition, IAU 255 notifies processor 205 that it has completed the connection between terminal DT1 and Internet 300.

Figure 4:
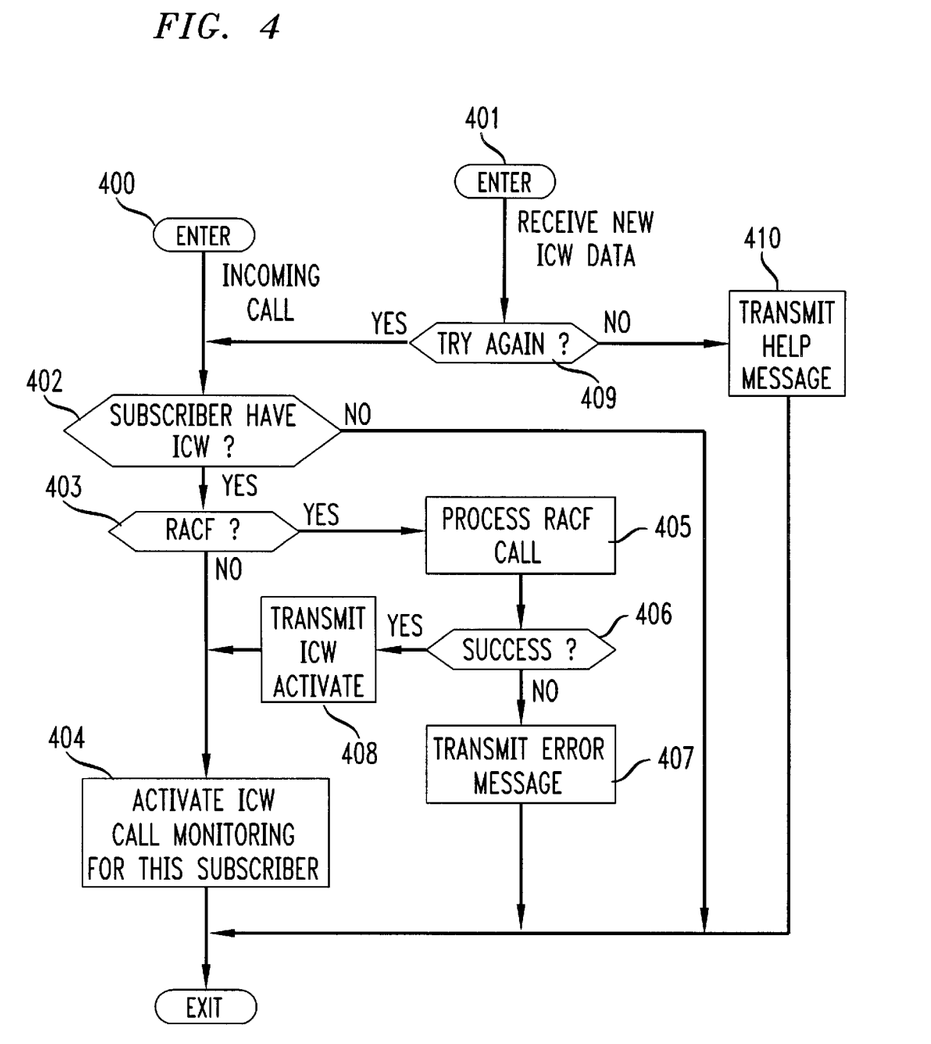
FIGS. 4 and 5 illustrate in flow chart form the programs which implement the principles of the invention in the IAS of FIG. 1.

If the login is successful, then processor 205 invokes the program of FIG. 4. Processor 205, in accord with the program, checks (block 402) the contents of field 250-8 of the associated record 250 (FIG. 2) to determine if the caller subscribes to the inventive "Internet Call Waiting" (ICW) service. If not, then processor 205 exits the program. If so, then processor 205 checks (block 403) such contents to determine if the function is activated/deactivated remotely by IAS 200, in accord with an aspect of the invention. (Such remote activation will also be referred to herein as Remote Access Call Forwarding (RACF) and is a feature that is currently offered by a local exchange carrier, e.g., Bell Atlantic by the service name of "Ultraforward" (service mark of Bell Atlantic), for a telephone call not involving the Internet.) Alternatively, such contents may indicate that the call forwarding function is selective and/or activated by the subscriber. Assuming that the call forwarding function will be activated remotely, in accord with an aspect of the invention, i.e., by IAS 200, then processor 205 (block 405) unloads a telephone number that it needs to call to activate the call forwarding service from field 250-9, which number is assumed to be associated with CO 25. Processor 205 then instructs VRU 225 via API 220 to place an out-going call to CO 25. In response to receiving an outgoing call request from VRU 225 via telephone line connection 260, PBX 235 selects an idle channel of communications path 150 (FIG. 1) and sends a call set-up message via the associated signaling channel to TS 105, in which the message includes the telephone number unloaded from field 250-9. TS 105, in turn, translates the called telephone number into a routing indicator, and, in accord with that indicator, establishes a telephone connection in a conventional manner to the CO 25 call forwarding service. That service responds to the incoming call by interacting with VRU 225 (which executes a "script" that it receives from processor 205) to obtain the subscriber's telephone number (250-3) and RACF password (field 250-11). Processor 205, via VRU 225 and in response to the latter request, outputs the contents of field 250-10 to the telephone connection extending back to CO 25, which contents is a telephone number associated with communication path 150-10 (FIG. 3) that is used for receiving forwarded calls, as will be discussed below. As a result of such interaction, CO 25 is primed during the time that station S1 is busy to forward a call directed to station S1 to IAS 200.

Processor 205 then checks (block 406) to see if it had been successful in activating call forwarding, as noted by the receipt of a confirmation from VRU 255 indicating that it had successfully interacted with CO 25. If so, then processor 205 (block 408) sends a message indicating that the Internet call waiting function has been invoked, which terminal DT1 displays on its associated display. Processor 205 (block 404) then sets up to monitor for calls that are forwarded to IAS 200 as a result of the terminal DT1 subscriber's telephone line 10 being busy on the Internet. The processor 205 program then exits. If such activation is not successful, then processor 205 (block 407) sends a message to terminal DT1 for display thereat to identify the nature of the failure, which may be, for example, that CO 25 did not answer the out-going call or that VRU 255 received an error message from CO 25 after VRU 225 had transmitted the subscriber telephone number, subscriber RACF password or the forward-to telephone number. Processor 205 then exits the program. If the subscriber, in response to the displayed failure message, enters a request for an activation retry, in which the request may contain a corrected CO 25 RACF service telephone number or another password that is to be supplied to CO 25, then the processor program is entered at block 401 and proceeds to block 409. If the subscriber entered a valid request, and an error threshold has not been exceeded, then the processor program returns to block 402. In doing so, the program unloads the associated record 250 from memory. If the subscriber does not enter a valid request or repeatedly fails to enter a correct password, thenprocessor 205 transmits a help message (block 410) and exits.

Returning now to FIG. 3, it is seen that IAS 200 includes a plurality of voice signal processors (VSP) 245-1 through 245-j, one of which is illustrated in broad block diagram form, namely, VSP 245-1 (hereinafter just (VSP) 245). VSP 245 includes central processor unit (CPU) 248, telephone line interface (TLI) 246 and a connection to LAN 240. VSP 245 communicates with PBX 235 via a selected one of the paths 270, and communicates with processor 205, IIU 215 and IAU 255 via LAN 240. In an illustrative embodiment of the invention, VSP 245, may be, for example, a personal computer having an Intel Pentium processor running under the Microsoft Windows 3.11 operating system, an Etherlink 10 BASE-T LAN interface card available from 3 Com Corporation of Santa Clara, Calif., and a V.34 Office F/X (version 2.0) sound card having a telephone interface available from Spectrum Signal Processing, Inc. of Mountain View, Calif.

VSP 245 interconnects conventional telephone signaling messages (e.g., D channel) and voice signals (e.g., B channel) received from PSN 100 via PBX 235 and path 270-1 with conventional TCP/IP packet network communications that is transported over Ethernet LAN 240 and Internet 300. The processing of calls forwarded from PSN 100 and routed to Internet 300 via LAN 240 will be explained below in detail. It is noted at this point, however, that particular software, such as the VocalTec version 3.0 software product available from VocalTec, Inc. of Northvale, N.J., may be used in VSP 245 to process, compress and then packetize voice signals that are received via PBX 235 and TLI 246 for transmission to Internet 300 via LAN 240. Similarly, such software may be used to convert the contents of packets representing voice into a stream of voice signals that is transmitted to station S1 via TLI 246, path 270-1, PBX 235 and PSN 100.

If, while the subscriber is busy "surfing" the Internet, a caller at station S2 places a call to station S1, then a telephone connection is established in a conventional manner from the station S2 telephone line to CO 25 via CO 50, TS 110 and TS 105 (FIG. 1). Specifically, responsive to the receipt of the station S2 call, CO 25 determines that station S1 is busy and that call forwarding has been activated at station S1. As such, CO 25, in a conventional manner, directs the call to IAS 200 in accord with the call forwarding telephone number that CO 25 received as interacting with IAS 200 in the manner discussed above. In doing so, CO 25 sends a message to TS 105 requesting a rerouting of the station S2 call and containing the IAS 200 telephone number as the destination for such rerouting. Such a message will typically contain the ANI of the called party (station S1) and may also contain the telephone number of the forwarded party, namely station S2. TS 105, in response to the receipt of the message, routes the call to its new destination—IAS 200. To re-route the call, TS 105 signals IAS 200 (PBX 235) that a call is being routed (forwarded) thereto via an idle B channel serving the particular call type, in which such signaling is transmitted over the associated D signaling channel. (As mentioned above, if the call is being forwarded to IAS 200, then the toll switch routes the call via communications path 150-10. Calls directed to Internet 300, on the other hand, are routed over communications path 150-11.) The signaling information that is transported over a D channel of path 150-10 includes, inter alia, the forward-to-number used by CO 25 and the ANI of station S1. Such information may also include the calling party telephone number (station S2). PBX 235, responsive to receipt of such information, sends a message identifying the newly-arrived call and containing information relating thereto to processor 205 via API 230. Processor 205, in turn, instructs PBX 235 to assign an idle VSP 245i to the call.

Since the station S2 call is forwarded to IAS 200 via path 150-10, then the call is received via PBX 235. Also referring now to FIG. 5, upon receipt of the call, PBX 235 alerts processor 205 to the incoming call and passes the station S2 telephone number (if available) as well as the station S1 ANI thereto. Processor 205 (block 501) in response to receipt of the latter number (ANI) uses the number to access its internal memory and unload a copy of the subscriber's record 250. If the subscriber is not connected to IAS 200 or if the subscriber does not wish to answer the call (as shown below), then processor 205 (block 507) does not answer the call and exits, thereby leaving it to the calling party and PBX 235 to terminate the call in a conventional manner. If, on the other hand, the contents of field 250-14, FIG. 2, indicates that the called subscriber is busy on the Internet, then processor 205 (block 502) forms an alerting message containing a "canned" announcement indicating, inter alia, (a) that a call is waiting, (b) telephone number of the waiting call (if available), and (c) call answering options, i.e., connect to voice mail, terminate call, or connect call, as mentioned above. Processor 205 then assembles the message into one or more data packets each containing the assigned Internet IP address as the destination and supplies each such packet to IIU 215 via LAN 240. IIU 215, in turn, routes the packets to module IAU 255, which then transmits the payload data as it is received over path 150-11 and the assigned B channel in a conventional manner. The data is then transported over the connection to CO 25, for transmission over analog telephone line 10 (FIG.1). Upon receipt of the data, terminal DT1 displays the information characterized by the data, e.g., the aforementioned announcement, on the terminal DT1 display, thereby alerting the subscriber to the waiting call even though the subscriber's telephone line is connected to the Internet (block 503), in accord with an aspect of the invention.

Figure 5:
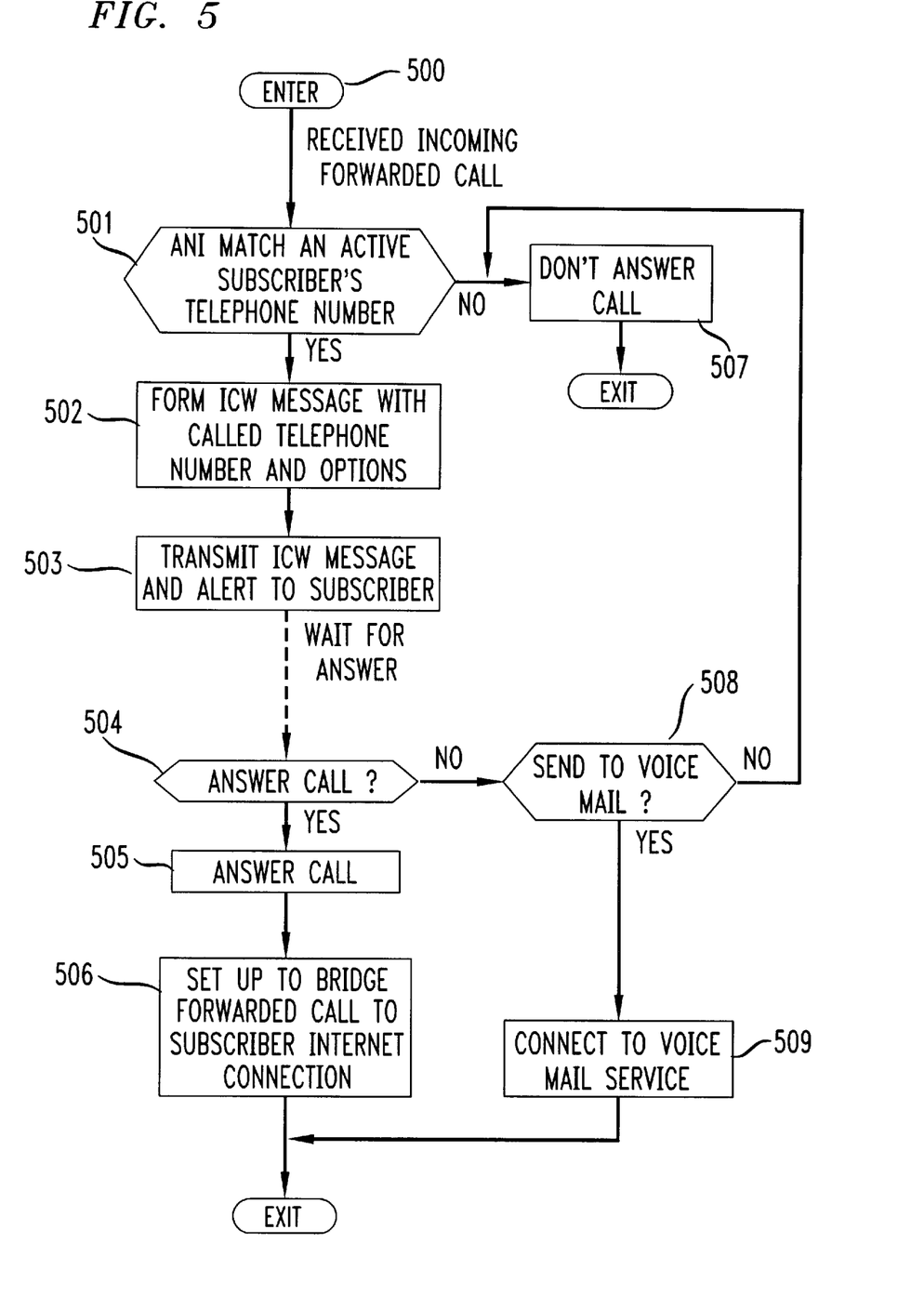

Following the foregoing, processor 205 waits for receipt of a response/answer from the alerted subscriber, as represented by the dashed line in FIG. 5. When processor 205 receives the expected response via path 150-11, then processor 205 (block 504) checks to see if the subscriber elected to answer the forwarded call. If so, then processor 205 (block 505) directs VSP 245 (i.e., TLI 246 and CPU 248) to answer the call. TLI 246, in response to receipt of a control signal from processor 205 via LAN 240 and CPU 248, transmits an answer supervision signal over path 270. In response to receipt of the latter signal, PBX 235 sends an answer supervision signal for the forwarded call to the toll switch via the D channel of path 150-10. Processor 205 then sets up to bridge the calling party to the subscriber via VSP 245, LAN 240 and IAU 255(block 506). Such "bridging" is established between VSP 245 and IAU 255 via LAN 240 and IIU 215 router as a conventional data packet communications. Processor 205 unloads from memory 250 (i.e., field 250-7, FIG. 2) information identifying the type of packet voice software that is loaded in the subscriber's terminal DT1. Processor 205 then instructs processor 248 (VSP 245) to invoke the aforementioned VocalTec software (or other software that performs a similar function) that is designed to process a telephone call that is to be transported over the Internet 300. The CPU 248 software, in turn, returns a response to processor 205 acknowledging its instruction to receive and transmit packets from and to the IP address previously assigned to the subscriber's Internet connection via access unit 255.

Thereafter, the assigned VSP245/TLI 246 supplies voice signals that it receives from the calling party to CPU 248 as a conventional data stream. CPU 248, in turn, collects the signals and forms them into packets in accordance with the aforementioned VocalTec software, which attaches to each such packet the IP address assigned to the subscriber's connection. CPU 248 then presents the packet to LAN 240 and IIU 215, which in turn routes the packet in a conventional manner to the LAN 240 port connected to access unit 255. Unit 255, in turn, transmits the data packet as well as any other packets received from Internet 300 and addressed to DT1 over the B-channel assigned to the subscriber's connection. Briefly referring again to FIG. 1, in an illustrative embodiment of the invention, data terminal DT1 may be, for example, a personal computer running under the Microsoft Windows operating system and driven by, for example, the Intel Pentium processor. Terminal DT1 also includes a conventional sound card, such as the UltraSound MAX sound card available from Gravis Computer Technology of Bellingham, Wash., as well as attached speakers and microphone. Also, conventional software packages such as the aforementioned Chameleon software and Internet Phone software, version 3.0, also available from VocalTec are loaded in terminal DT1. As configured, a conventional modem interfaces terminal DT1 with telephone line 10.

When terminal DT1 receives packets via line 10, the Internet software running on the subscriber's terminal DT1 examines each such packet to determine if it contains voice signals or information originating from the Internet. If the former, then the "Internet Phone" software reassembles the voice signal from a series of received packets, as is done conventionally, and then presents the result to the terminal DT1 sound card which causes the signals to be routed to the terminal DT1 loudspeaker for presentation to the subscriber. Internet information, on the other hand, is identified and processed in a background mode for display on the terminal DT1 display.

When the subscriber talks into the terminal DT1 microphone, the resulting voice signals are converted into a series of packets by the sound card and accompanying software. Terminal DT1 then outputs the packets via the terminal DT1 modem to line 10 for transmission to IAS 200 via CO 25 and PSN 100. In doing so, terminal DT1 software inserts an address in each such packet so that the packet may be routed to the originator of the call, as is done conventionally in the transmission of a voice packet in telephony. Each packet that IAS 200 receives from terminal DT1 is transported via IAU 255 and LAN 240 to IIU 215 which then routes the packet to either Internet 300 or VSP 245 based on the destination address contained in the packet. The VSP 245 port that receives the packet unloads the payload and passes it to the packet voice software that CPU 248 is executing. That is, CPU 248 converts a series of voice packets into a digital voice signal, which TLI 246 then supplies to PBX 235 via path 270-1. PBX 235, in turn, transmits the voice signal over path 150-10 during the assigned B channel to TS 105, which retransmits the signal to station S2 by way of CO 50. The call waiting party and Internet connected subscriber may continue to communicate with one another in this manner, until the call is terminated.

In response to receipt of the call-waiting notification, the subscriber may elect to have the station S2 call forwarded to voice mail server 265 (FIG. 3). If processor 205 (block 508, FIG. 5) receives that option from the subscriber, then processor 205 directs PBX 235 to interrupt the (unanswered) connection between path 150-10 and VSP 245, and to redirect the station S2 incoming call on path 150-10 to voice mail service (VMS) 265 as represented by block 509, FIG. 5. At that point, VMS 265 transmits an announcement to the calling party and presents the calling party with the option to leave a voice message for the called subscriber. The calling party may then interact with VMS 265 in a conventional manner to exercise the option or immediately terminate the call.

Figure 6:
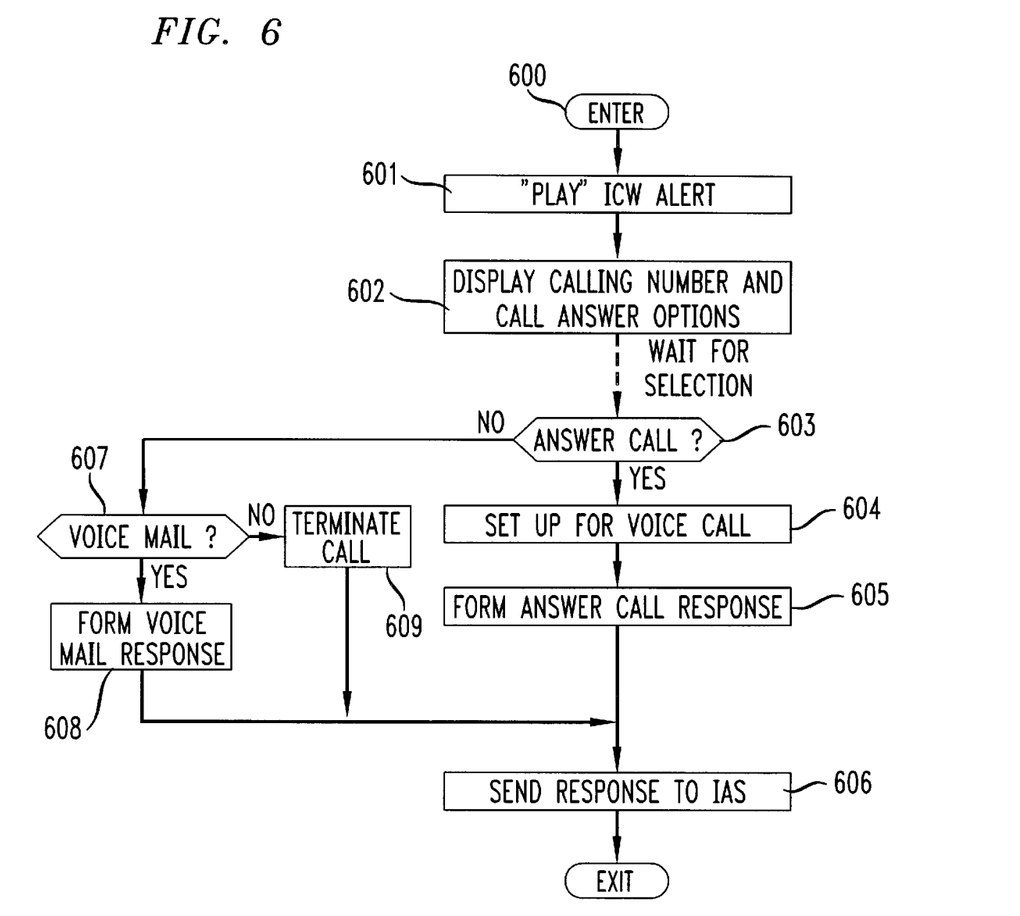
FIGS. 6, 7 and 8 illustrate in flow chart form the programs which implement the principles of the invention in the subscriber terminal of FIG. 1.

When terminal DT1 receives a data message encoded in analog form via its internal modem and telephone line 10, the modem converts the encoded analog signal to a digital signal, which is then accumulated to form a message. If the message represents the aforementioned call waiting message, then terminal DT1 invokes the program of FIG. 6 to process the message. Specifically, the DT1 program (block 601) causes the terminal DT1 hardware to generate and output via the terminal loudspeaker(s) a tone that simulates an alerting signal, e.g., a ringing signal. The program (block 602) then displays the option message along with the calling telephone number. If the subscriber selects one of the displayed options, then the program checks to see if the entered option is to answer the call (block 603). If so, then the program (block 604) prepares to execute the aforementioned VocalTec Internet Phone software that allows the subscriber to place and/or receive a voice call via the Internet by storing in associated memory the IP address of VSP 245 contained in the message sent by IAS 200 (processor 205). The terminal DT1 program (block 605) then forms a response to answer the call and then (block 606) transmits the response to IAS 200. If the subscriber does not elect to answer the call, then the program (block 607) checks to see if the subscriber wants the call to be routed to a voice mail service. If that is the case, then the program (block 608) forms a voice-mail response and proceeds to block 606. Otherwise, the program (block 609) forms a "terminate call" response, proceeds to block 606 and then exits.

Figure 7:
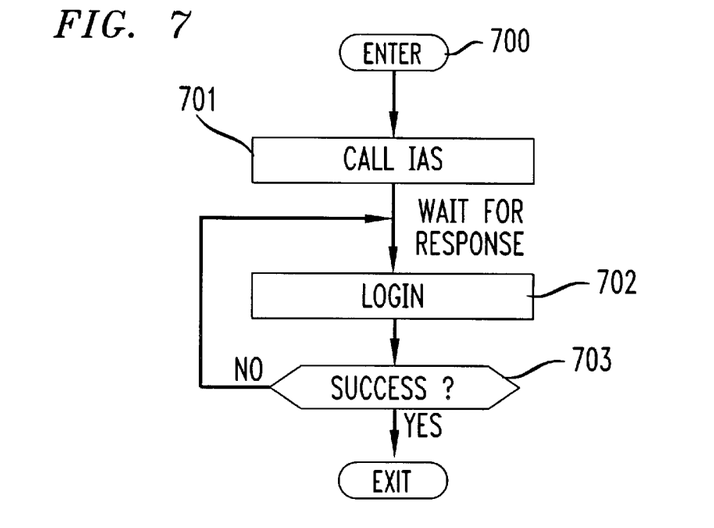
Figure 8:
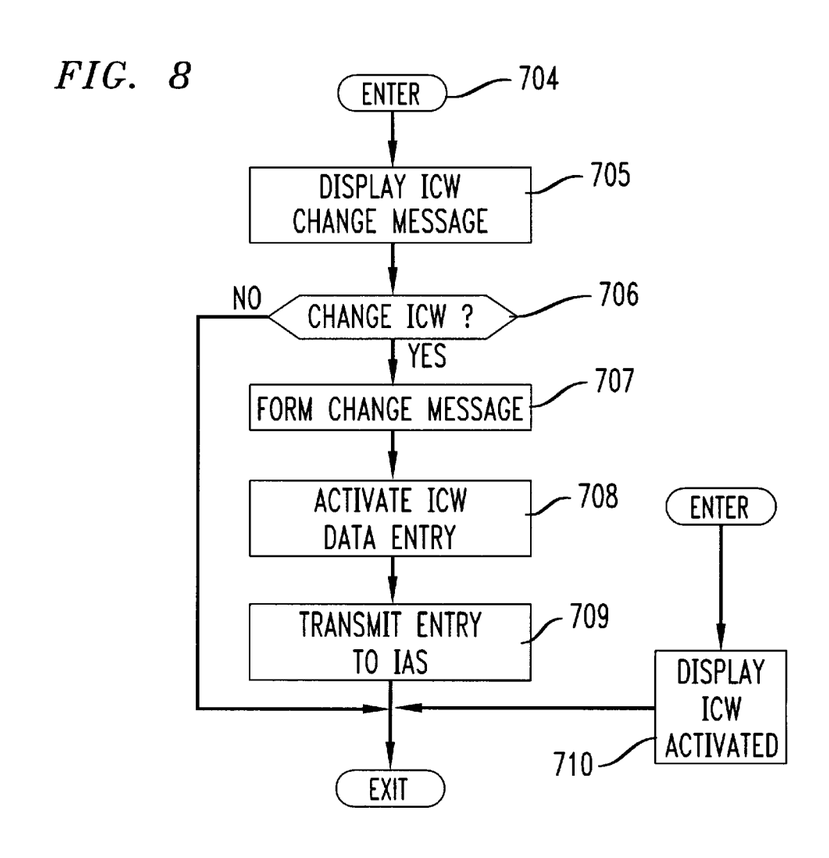

FIG. 7 illustrates in flow chart form the program that a terminal, e.g., terminal DT1, may invoke to place a telephone call to an IAS 200, e.g., IAS 200, for the purpose of establishing a connection to the Internet. As mentioned above, such software may be any one of a number of different commercial software products that are designed to allow a user to interact with the Internet, for example, the aforementioned Chameleon software. Specifically, when the terminal program is invoked it unloads (block 701) from internal memory a data record containing the telephone number that the caller uses to access the Internet. The program then places a call to that telephone number and then waits for receipt of a response from the called IAS, e.g., IAS 200. Upon receipt of the expected response, the program (block 702) sets up to "login" into the called IAS as is done conventionally by transmitting a requested password. If the login is successful (block 703), the terminal application program that is loaded when the subscriber establishes the Internet session, sends a message to processor 205 indicating that it can receive a call alert message. If processor 205 receives that message, then it updates the contents of field 250-14 (FIG. 2) to indicate that the user may receive call alert messages. The program then exits. If the login is not successful, then the caller/subscriber may re-enter his/her password (block 702). It is noted that IAS 200 may terminate the call if the caller fails to enter a valid password after making several attempts to do so.

If the program receives a message requesting new ICW information, then the program is re-entered (block 704) and displays the IAS request(block 705). If the caller/subscriber enters via, e.g., the terminal DT1 keyboard, such new information, then the program (block 706) checks the entry to see if it corresponds with the IAS request. If not, then the program exits Otherwise, the program forms a message containing the entry (block 707), updates (block 708) the associated data record to include the new entry (e.g., the correct RACF password), transmits (block 709) the message to the IAS and then exits. Thereafter, when the program receives a message from IAS 200 indicating that RACF has been activated, then the program (block 710) displays that event and then exits.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of processing a telephone call from a calling station to a called station that is busy as a result of having established a connection to a data network via an access server, said method comprising the steps of receiving said call at a telephone switch and, responsive to said called station being busy, forwarding said call to said access server, responsive to receiving said call at said access server, sending a data message to said called station via said connection to said data network to alert a subscriber at said called station to the receipt of said call, and connecting said calling station to said called station via said connection to said data network so that a caller at said calling station may communicate with said subscriber at said called station.

2. The method of claim 1 wherein said step of connecting said calling station includes the step of, responsive to receiving from said called station via said connection to said data network a message containing a request to answer said call, then performing said step of connecting.

3. The method of claim 1 wherein said step of connecting said calling station includes the step of multiplexing signals received from said calling station and signals received from said data network and addressed to said called station over said connection to said called station.

4. The method of claim 1 wherein said step of connecting said calling station includes the step of routing data signals received from said called station via said connection to said data network and routing voice signals received from said called station via said connection to said calling station.

5. The method of claim 2 wherein said step of connecting said calling station includes the step of, responsive to said message from said called station containing a request to connect said call from said calling station to a voice mail service, then routing said call to a voice mail service.

6. The method of claim 2 wherein said step of connecting said calling station includes the step of, responsive to said message from said called station containing a request to not answer said call from said calling station, then sending a request to said switch to not answer said call.

7. The method set forth in claim 1 wherein said data network is an Internet network further comprising the steps of responsive to receiving an initial call to said called station at said access server, connecting said initial call to said Internet, determining if said subscriber also subscribes to a call forwarding service that may be activated from a telephone station other than said called station, if so, then activating said call forwarding service.

8. The method of claim 7 wherein said step of activating includes the steps of prior to performing said step of activating sending a message to said subscriber as a way of presenting said subscriber with the option to answer said call from said calling party, and performing said activating step if said subscriber elects to answer said call from said calling party.

9. The method of claim 8 wherein said presenting includes the option of not answering said call from said calling party and, responsive to said subscriber electing to not answer said call, allowing said call from said calling party to terminate.

10. The method of claim 8 wherein said presenting includes the option of routing said call from said calling party to a voice mail service and, responsive to said subscriber electing such routing, then connecting said call from said calling party to a voice mail service.

11. The method of claim 7 wherein said step of activating includes the step of sending a message to said called station via said connection to notify said called station that said activation has been executed.

12. The method of claim 1 wherein said data network is an information network.

13. The method of claim 1 wherein said data network is the world wide web.

14. A method of processing a call waiting feature for a first telephone station set whose telephone line is connected to the Internet, comprising the steps of responsive to receiving at a data server an initial call from said first telephone station, extending a connection from said first telephone station to said Internet, receiving a voice call from a second telephone station directed to said first telephone station, and responsive to said first telephone station being connection to the Internet, forwarding said voice call to said data server, responsive to receiving said voice call at said data server, sending a data message via said connection to said first telephone station to alert a subscriber to the receipt of the voice call from said second telephone station, and bridging a connection to said telephone station to the connection between said Internet and said first telephone station so that a caller at said second telephone station may communicate with said subscriber at said first telephone station.

15. The method of claim 14 further comprising the steps of responsive to receiving from said first telephone station a message containing a request to answer said voice call, performing said step of bridging.

16. The method of claim 14 wherein said step of bridging said second telephone station includes the step of multiplexing voice signals received from said second telephone station and data signals received from said Internet and addressed to said first telephone station over said connection to said first telephone station.

17. The method of claim 14 wherein said step of bridging said second telephone station includes the step of routing data signals received from said first telephone station via said connection to said Internet and routing voice signals received from said first telephone station via said connection to said second telephone station.

18. The method of claim 15 wherein said step of bridging said second telephone station includes the step of, responsive to the receipt of said request message from said first telephone station containing a request to connect said voice call from said second telephone station to a voice mail service, then routing said call from said second telephone station to a voice mail service.

19. The method of claim 15 further comprising the step of responsive to said request message from said telephone station containing a request to not answer said voice call from said first telephone station, then not answering the voice call.

20. The method set forth in claim 14 further comprising the steps of responsive to connecting the initial call to said Internet, determining if a subscriber associated with said first telephone station also subscribes to a call forwarding service that may be activated from a telephone station other than said first telephone station, if so, then activating said call forwarding service.

21. The method of claim 20 wherein said step of activating includes the steps of prior to performing said step of activating, sending a message to said first telephone station as a way of presenting the option to answer said voice call to said subscriber, and performing said activating step if said subscriber elects to answer said voice call.

22. The method of claim 21 wherein said presenting includes the option of not answering a voice call and, responsive to said subscriber electing to not answer a voice call, allowing said voice call to terminate.

23. The method of claim 21 wherein said presenting includes the option of routing a voice call to a voice mail service and, responsive to said subscriber electing such routing, then connecting said voice call to a voice mail service.

24. The method of claim 20 wherein said step of activating includes the step of sending a message to said first telephone station via said Internet connection to notify said subscriber that said activation has been executed.

* * * * *